United States Patent [19]
Thomsen et al.

[11] Patent Number: 5,987,246
[45] Date of Patent: Nov. 16, 1999

[54] GRAPHICAL PROGRAMMING SYSTEM AND METHOD INCLUDING THREE-DIMENSIONAL NODES WITH PRE-DEFINED INPUT AND OUTPUT CAPABILITIES

[75] Inventors: Carsten Thomsen; Jeffrey L. Kodosky, both of Austin, Tex.

[73] Assignee: National Instruments Corp., Austin, Tex.

[21] Appl. No.: 08/799,955

[22] Filed: Feb. 14, 1997

[51] Int. Cl.$^6$ ...................................................... G06F 9/45
[52] U.S. Cl. ........................ 395/702; 345/349; 345/501
[58] Field of Search ..................... 326/38, 41; 345/162, 345/347, 349, 352, 355, 356, 435, 509, 522; 364/200, 188; 395/159, 183.14, 377, 500, 800, 800.26, 825, 877, 702, 704; 706/47; 707/100, 506, 507

[56] References Cited

U.S. PATENT DOCUMENTS

| | | | |
|---|---|---|---|
| 4,901,221 | 2/1990 | Kodosky et al. | 364/200 |
| 5,303,388 | 4/1994 | Kreitman et al. | 395/159 |
| 5,327,568 | 7/1994 | Maejima et al. | 395/707 |
| 5,452,414 | 9/1995 | Rosendahl | 345/355 |
| 5,774,122 | 6/1998 | Kojima | 345/355 |
| 5,821,934 | 10/1998 | Kodosky et al. | 345/349 |
| 5,861,882 | 1/1999 | Sprenger et al. | 345/326 |

OTHER PUBLICATIONS

LabVIEW User Manual, Jan. 1990, National Instruments Corp., pp. 3–18 to 3–19.

*Primary Examiner*—Tariq R. Hafiz
*Assistant Examiner*—Antony Nguyen-Ba
*Attorney, Agent, or Firm*—Jeffrey C. Hood; Conley, Rose & Tayon

[57] ABSTRACT

A graphical programming system and method which includes three-dimensional nodes that are wired or connected to from a graphical program or block diagram. Each of the three-dimensional nodes includes a plurality of sides that are designed to receive pre-defined inputs. In one embodiment, each node includes a left side for receiving data input and a right side for producing output data. The upper or top side of each node is designed to receive inputs regarding error conditions and/or initialization information. The front side of each node is reserved for displaying the name of the node or the function performed by the node. The back side of each node is reserved for timing and synchronization inputs. The bottom side of each node is designed to receive base configuration information and/or type declaration information. The user is only allowed to connect data of the specified type to the designated inputs of each node. If the user attempts to connect the wrong type of data to a respective input side of a node, the connection is broken, thus alerting the user of the problem. Therefore, the graphical programming system of the present invention simplifies the assembly process and provides increased error checking. The user can also manipulate or rotate the graphical program or block diagram to view different sides and thus view different classes of inputs.

45 Claims, 10 Drawing Sheets

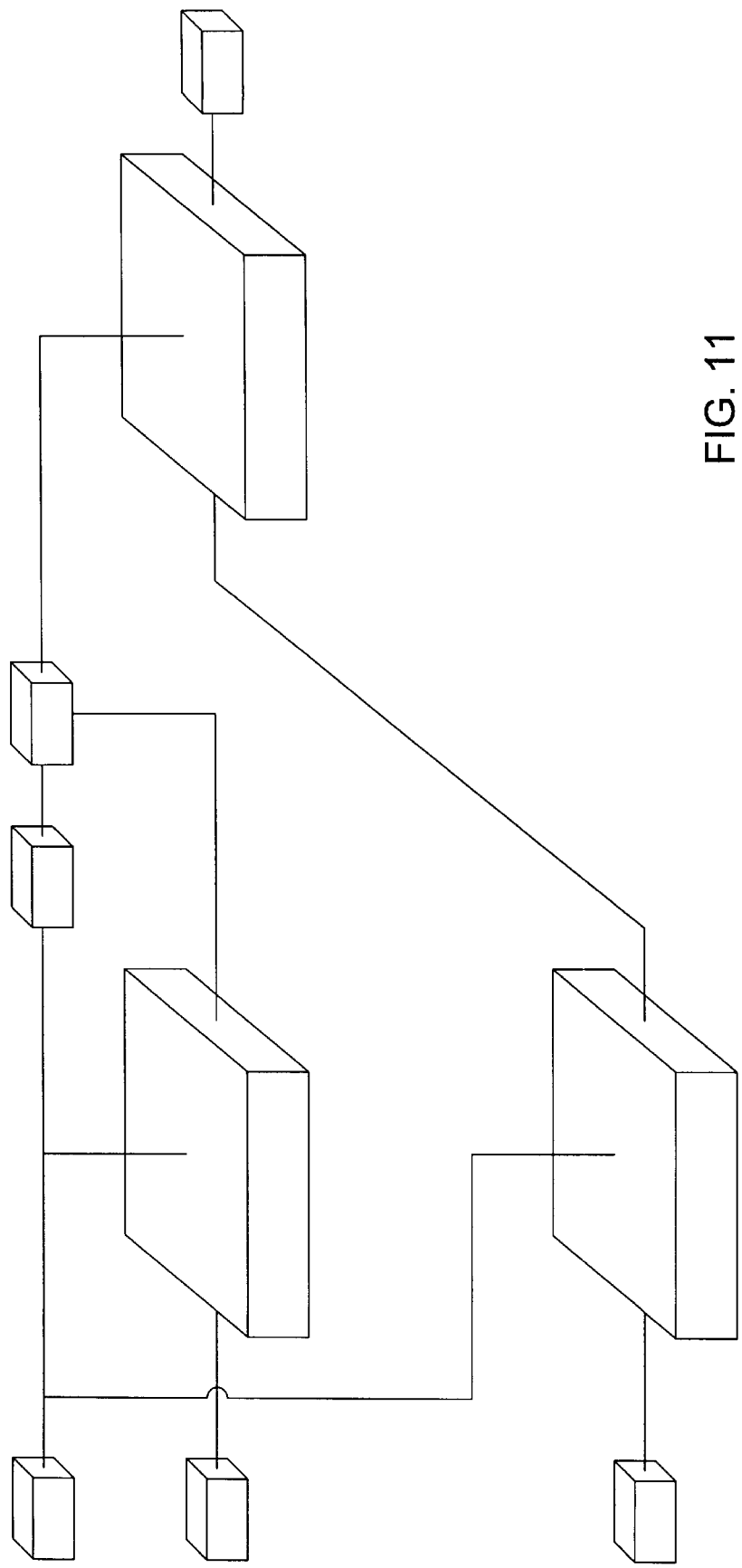

GRAPHICAL PROGRAMMING SYSTEM AND METHOD INCLUDING THREE-DIMENSIONAL NODES WITH PRE-DEFINED INPUT AND OUTPUT CAPABILITIES

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

BACKGROUND OF THE INVENTION

1. Field of the Invention

The present invention relates to graphical systems for creating and executing data flow programs, and more specifically to a graphical programming system and method having three-dimensional nodes with formatted or pre-defined input characteristics, wherein sides or faces of the three-dimensional nodes are pre-defined to receive inputs of a certain type.

2. Description of the Related Art

In the field of instrumentation, computer systems are employed to model physical systems and emulate or control test and measurement hardware. An instrument is a device which collects information from an environment and displays this information to a user. Examples of various types of instruments include oscilloscopes, digital multimeters, pressure sensors, etc. Types of information which might be collected by respective instruments include: voltage, resistance, distance, velocity, pressure, frequency of oscillation, humidity or temperature, among others. An instrumentation system typically includes a general purpose computer system which controls its constituent instruments from which it acquires data which it analyzes, stores and presents to a user of the system.

Computer control of instrumentation has become increasingly desirable in view of the increasing complexity and variety of instruments available for use. U.S. Pat. Nos. 4,901,221 and 4,914,568 to Kodosky et al disclose a graphical system and method, i.e. a graphical programming environment, for modeling a process and for emulating or controlling instruments. The system and method disclosed in Kodosky et al allows a user to create a program by connecting graphical objects or nodes in a data flow manner. As the user constructs the data flow program, machine language instructions are automatically constructed which characterize an execution procedure which corresponds to the displayed procedure. Therefore, a user can create a text-based computer program solely by using a graphically based programming environment. This graphically based programming environment may be used for creating virtual instrumentation systems and modeling processes as well as for any type of general programming.

When a graphical data flow program, also referred to as an iconic program, is created, each graphical object or node has one or more inputs for receiving data and one or more outputs for producing data. The graphical data flow program may also include one or more structure nodes which perform sequencing or looping functions in the program. When the program is executed, each node executes when it has received data at all of its inputs. Thus each node executes in turn and produces data on its one or more outputs that are provided to other nodes in the system.

One problem with creating a graphical data flow program, as with any program, is debugging the program to correct errors. In a graphical programming environment, it is important to properly connect the inputs and outputs of the various nodes to avoid errors. U.S. Pat. Nos. 4,901,221 and 4,914,568 to Kodosky et al disclose a graphical system where the wires or connectors between nodes have different widths and colors corresponding to the different types of data propagating along the wire. This enables the user to more easily see which data types are connected to which node inputs, thus facilitating debugging. If the user connects the wrong data type to an input of a node, the system "breaks the wire" to the node, thus informing the user of the error.

However, it would be highly desirable for a graphical programming system to have more intuitive control characteristics and debugging features which provide a greater amount of error checking information to the user.

SUMMARY OF THE INVENTION

The present invention comprises a graphical programming system and method which includes three-dimensional nodes that are wired or connected to from a graphical program or block diagram. The three-dimensional nodes are preferably rectangular blocks but may comprise any three-dimensional polygonal shape. Each of the three-dimensional nodes includes a plurality of sides or faces that are designed to receive pre-defined inputs. In one embodiment, each node includes a left side for receiving input data and a right side for producing output data. One or more of the remaining sides or faces are designed to receive data of a pre-defined type.

The input configuration of each of the three-dimensional nodes is designed to approximate real world instruments. In the preferred embodiment, the front side of each node is reserved for displaying the name of the node or the fraction performed by the node. Also in the preferred embodiment, the back side of each node is designed to receive trigger, timing and synchronization inputs. Further, the upper or top side of each node is preferably designed to receive inputs regarding error conditions and/or initialization information, and the bottom side of each node is preferably designed to receive base configuration information and/or type declaration information.

When the user desires to create a graphical program, the user selects nodes from various palettes or node libraries and places them on the screen. The user then manipulates or configures the various nodes and connects the outputs and inputs of the various nodes to assemble the graphical program. The user can only connect data of the specified type to the designated inputs of each node. Thus, error condition and/or initialization signals are connected to the upper or top side of a node, triggering, timing and synchronization input signals are connected to the back side of a node, and configuration information and/or type declaration information signals are connected to the bottom side of a node.

If the user attempts to connect the wrong type of data to a respective input side of a node, the connection is broken, thus alerting the user of the error. Therefore, the graphical programming system of the present invention simplifies the assembly process and also provides increased error checking.

In the present invention, the user can manipulate or rotate the graphical program or block diagram to view different sides and thus view different classes of inputs. Thus the user can rotate the graphical program 180 degrees to view all of the timing and synchronization input signals connected to the back side of each of the nodes. Likewise the user can rotate the graphical program to view the graphical program from the top side or the bottom side, or to view the graphical program from the left or right side.

Therefore, the present invention comprises a graphical programming system having three-dimensional nodes with sides or faces designated to receive different classes or types of input information. The present invention thus simplifies the development process and provides enhanced error checking over prior graphical programming systems.

BRIEF DESCRIPTION OF THE DRAWINGS

The purpose and advantages of the present invention will be apparent to those skilled in the art from the following detailed description in conjunction with the appended drawings in which:

FIGS. 9–11 illustrate more complicated graphical programs including three-dimensional nodes according to the present invention.

DESCRIPTION OF THE PREFERRED EMBODIMENT

Incorporation by Reference

The following U.S. Patents are hereby incorporated by reference in their entirety.

U.S. Pat. No. 4,901,221 titled "Graphical System for Modeling a Process and Associated Method," issued on Feb. 13, 1990.

U.S. Pat. No. 4,914,568 titled "Graphical System for Modeling a Process and Associated Method," issued on Apr. 3, 1990.

U.S. Pat. No. 5,301,336 titled "Graphical Method for Programming a Virtual Instrument" filed Jul. 12, 1989 and issued Apr. 5, 1994.

U.S. Pat. No. 5,291,587 titled "Graphical System for Executing a Process and for Programming a Computer to Execute a Process, Including Graphical Variable Inputs and Variable Outputs" filed Nov. 19, 1992 and issued Mar. 1, 1994.

U.S. Pat. No. 5,301,301 titled "Polymorphic Dataflow block Diagram System and Method for Programming a Computer" and filed Jan. 30, 1991.

U.S. Pat. No. 5,481,740 filed Sep. 22, 1993 titled "Method and Apparatus for Providing Autoprobe Features in a Graphical Data Flow Diagram".

U.S. Pat. No. 5,481,741 filed Sep. 22, 1993 titled "Method and Apparatus for Providing Attribute Nodes in a Graphical Data Flow Diagram".

Figure 1:
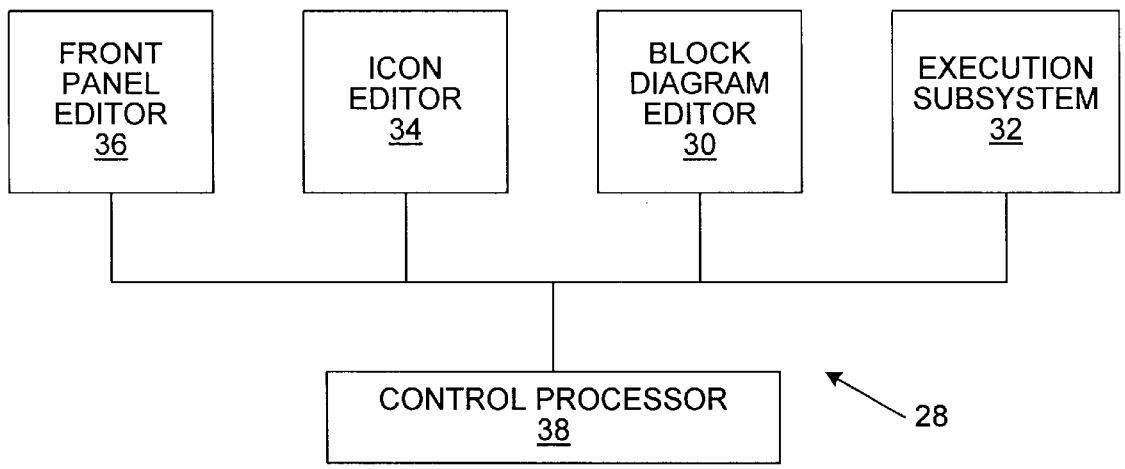
FIG. 1 is a block diagram illustrating a system for modeling a process and for emulating or controlling instruments according to the present invention.

Referring now to FIG. 1, a system 28 for modeling a process or creating a data flow program is shown. The system 28 includes a respective block diagram editor 30, an execution subsystem 32, an icon editor 34, and a front panel editor 36 all interconnected. The system 28 also includes a control processor 38 which connects to each of the front panel editor 36, icon editor 34, block diagram editor 30 and execution subsystem 32. In the preferred embodiment, the above elements are constructed in software, i.e., comprise software programs. The control processor 38 implements the above elements to perform the 3-D graphical programming system of the present invention.

Figure 2:
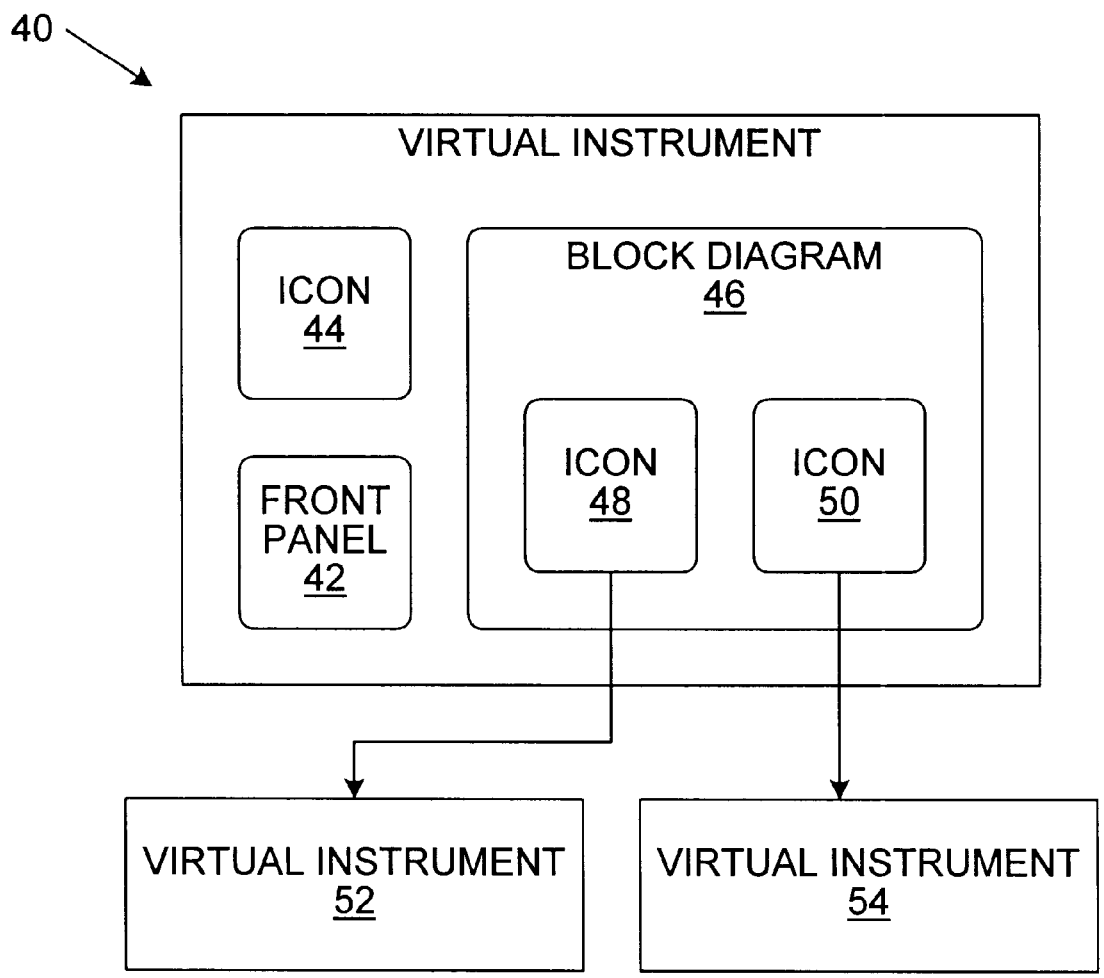
FIG. 2 is an illustrative drawing of a representation of a virtual instrument produced using the system of FIG. 1.

The system 28 can be used for a number of purposes, such as creating a graphical program. Referring now to FIG. 2, in the preferred embodiment the system 28 is shown primarily in creating "virtuial instruments" (VIs), which are instruments including software and/or hardware components. However, the system 28 of the present invention has many other applications, including the creation of general purpose graphical programs, modeling processes, or any other type of general programming.

The block diagram editor 30 is used to construct and display a graphical diagram, referred to as a block diagram 46, which visually displays a procedure by which a value for a input variable produces a value for one or more output variables. This procedure, together with the input and output variables, comprises a process model. Furthermore, as the user constructs the graphical diagram, the block diagram editor 30 constructs execution instructions which characterize an execution procedure which corresponds to the displayed procedure. In the preferred embodiment, the block diagram editor 30 constructs instructions in machine language which execute the block diagram created by the user. The execution subsystem 32 assigns at least one value to the input variable and executes the execution instructions to produce a value for the output variable.

The virtual instrument 40 includes a front panel 42 which permits interactive use of the virtual instrument 40 by a user. As will be explained more fully below, the front panel 42 permits graphical representation of input and output variables provided to the virtual instrument 40. The respective graphical representations on the front panel 42 for input and output variables are referred to as controls and indicators, respectively; although in some instances controls and indicators are referred to collectively as controls.

Thus, the virtual instrument 40 includes a block diagram 46 which graphically provides a visual representation of a procedure or method by which a specified value for an input variable displayed in the front panel 42 can produce a corresponding value for an output variable in the front panel 42. In other words, the user uses the block diagram editor 30 to create a graphical program, and the resultant graphical icons appear in the block diagram 46.

The virtual instrument 40 also includes an icon 44 which permits use of the virtual instrument 40 as a subunit in other virtual instruments (not shown). The virtual instrument 40 itself is a hierarchical construction which may comprise within its block diagram 46 respective icons 48 and 50 referencing other virtual instruments (sub-VIs) indicated generally by respective blocks 52 and 54. The block diagram 46 may also include one or more "primitives" corresponding to simple functions that may be performed. Together sub-VIs, primitives and other types of data processing elements comprised within the block diagram 46 are referred to as function icons. Function icons in the block diagram 46 have associated control means or software which implement the desired functions.

Figure 3:
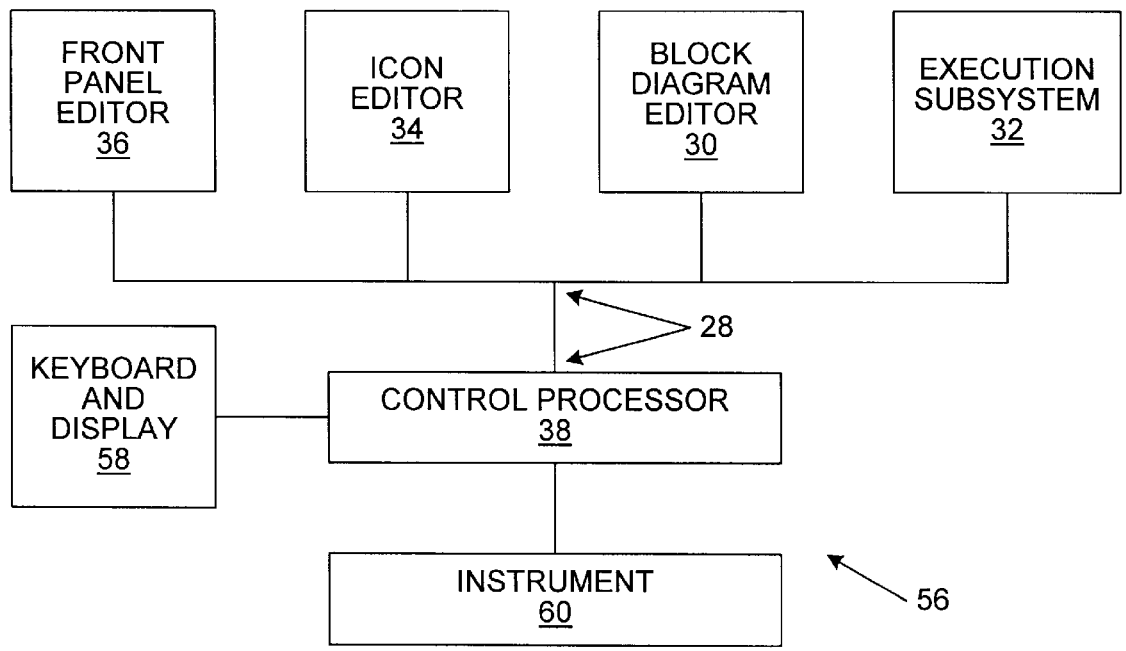
FIG. 3 shows a block diagram of an instrumentation system including the system of FIG. 1.

The generalized block diagram of FIG. 3 shows an instrumentation system 56 incorporating the system 28 shown in FIG. 1. Elements of the instrumentation system 56 which are substantially identical to those of second system 28 are designated with the same reference numerals as those of the system 28 for convenience. The instrumentation system 56 includes a keyboard and display 58 and an instrument 60. In a presently preferred embodiment, the control processor 38 and the keyboard and display 58 may be implemented using any type of general purpose computer.

The instrumentation system 56 is preferably used to control the instrument 60, i.e., acquire data from the instrument 60, analyze that data, store that data, and present that data to the user in a meaningful way. The block diagram editor 30 can also be used to create virtual instruments as desired.

Figure 4:
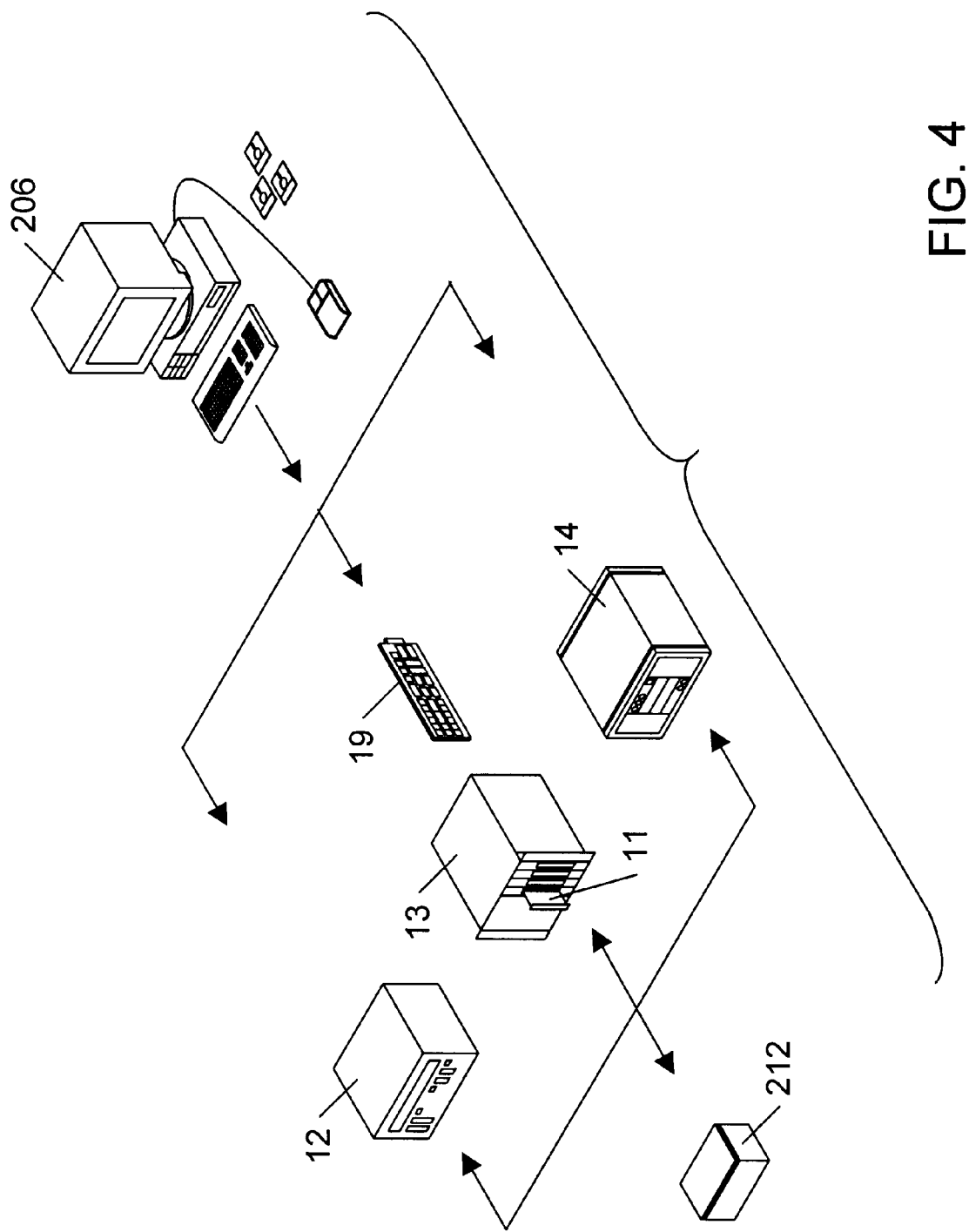
FIG. 4 is a representative drawing of various choices for an illustrative hardware instrumentation system of the preferred embodiment.

FIG. 4 illustrates various design choices available in an instrumentation system 204 in the preferred embodiment. As shown, a computer system 206 programmed according to the present invention can interface with a unit under test 212, i.e., can perform data acquisition and control of the unit under test 212, using a number of methods. These methods include using GPIB instruments 12, plug-in data acquisition boards 19 with associated signal conditioning logic 11, or VXI instruments 14. In addition a serial RS-232 method (not shown) can be used, as desired. It is noted that the computer 206 may be any type of computer including any type of Apple computer, IBM PC-compatible computer, PS/2, Sun workstation, etc.

Figure 5:
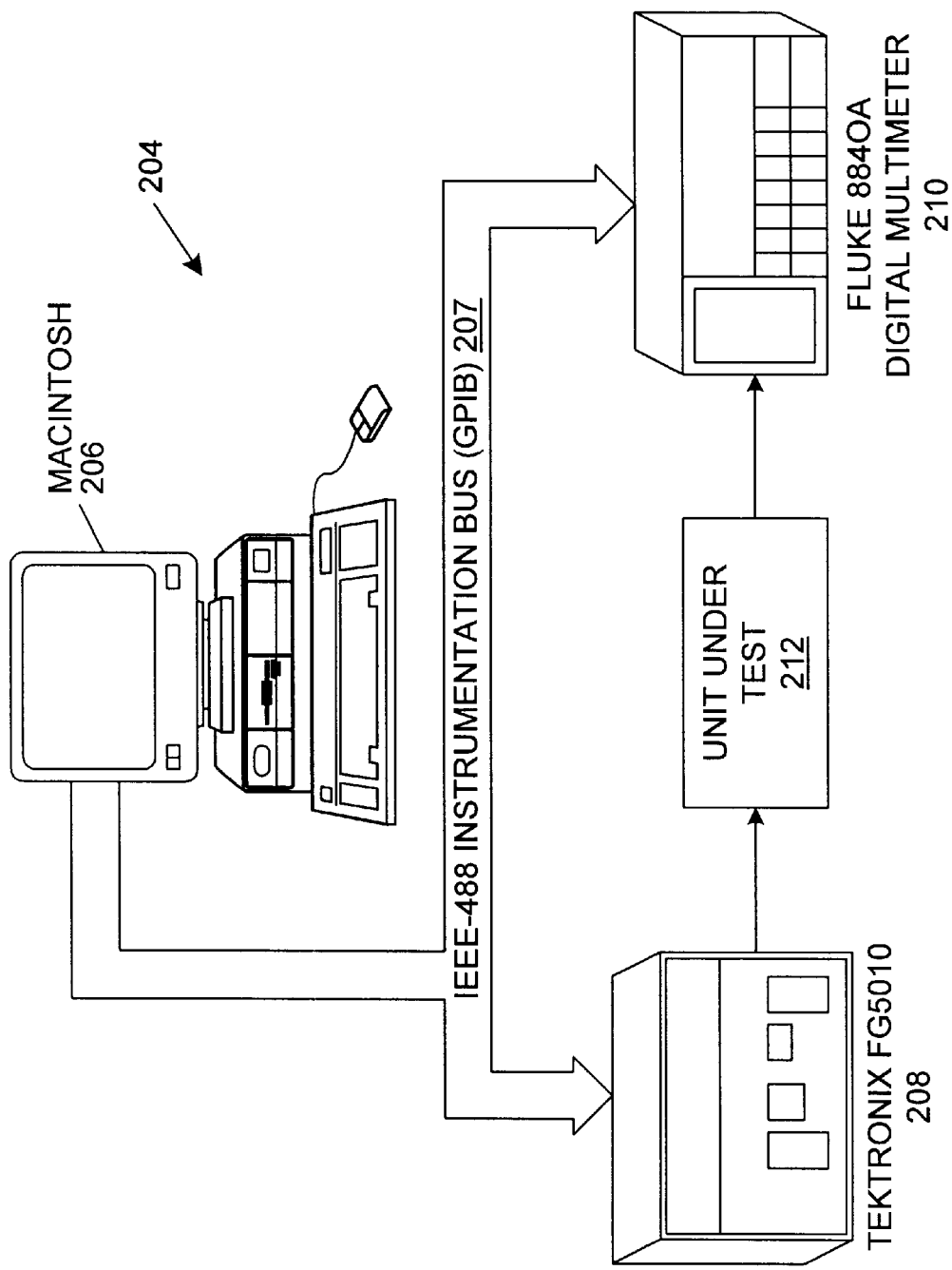
FIG. 5 is an illustrative hardware instrumentation system of the preferred embodiment.

FIG. 5 shows an illustrative hardware configuration of an instrumentation system 204 according to the present invention. The system 204 includes a computer 206 which includes the control processor 38 as well as the front panel editor 36, icon editor 34, block diagram editor 30, and execution subsystem 32. As previously mentioned the elements 30–36 are preferably implemented in software. The computer 206 illustrated in FIG. 5 includes an interface to a GPIB (general purpose instrument bus) 207 which in turn is connected to a Tektronix 5010 Function generator 208 and a Fluke 8840A digital multimeter 210. A unit under test 212 is coupled between the function generator 208 and multimeter 210 as shown.

It is also noted that other types of configurations for an instrumentation system 204 may be used. As discussed with regard to FIG. 5, instead of using actual instruments 208 and 210, the instrumentation system 204 may include one or more modular instruments on plug-in boards in conjunction with the VXI bus specification. The plug-in board instruments would then assume the function of the function generator 208 and multimeter 210. In addition, instead of requiring instruments 208 and 210 or plug-in modular instruments, the computer 206 can include a data acquisition card including A–D (analog to digital) and D–A (digital to analog) converters, wherein the D–A converter generates waveform signals to the unit under test 212 and the output from the unit under test 212 is then provided through an A–D converter to the computer system 206.

Figure 6:
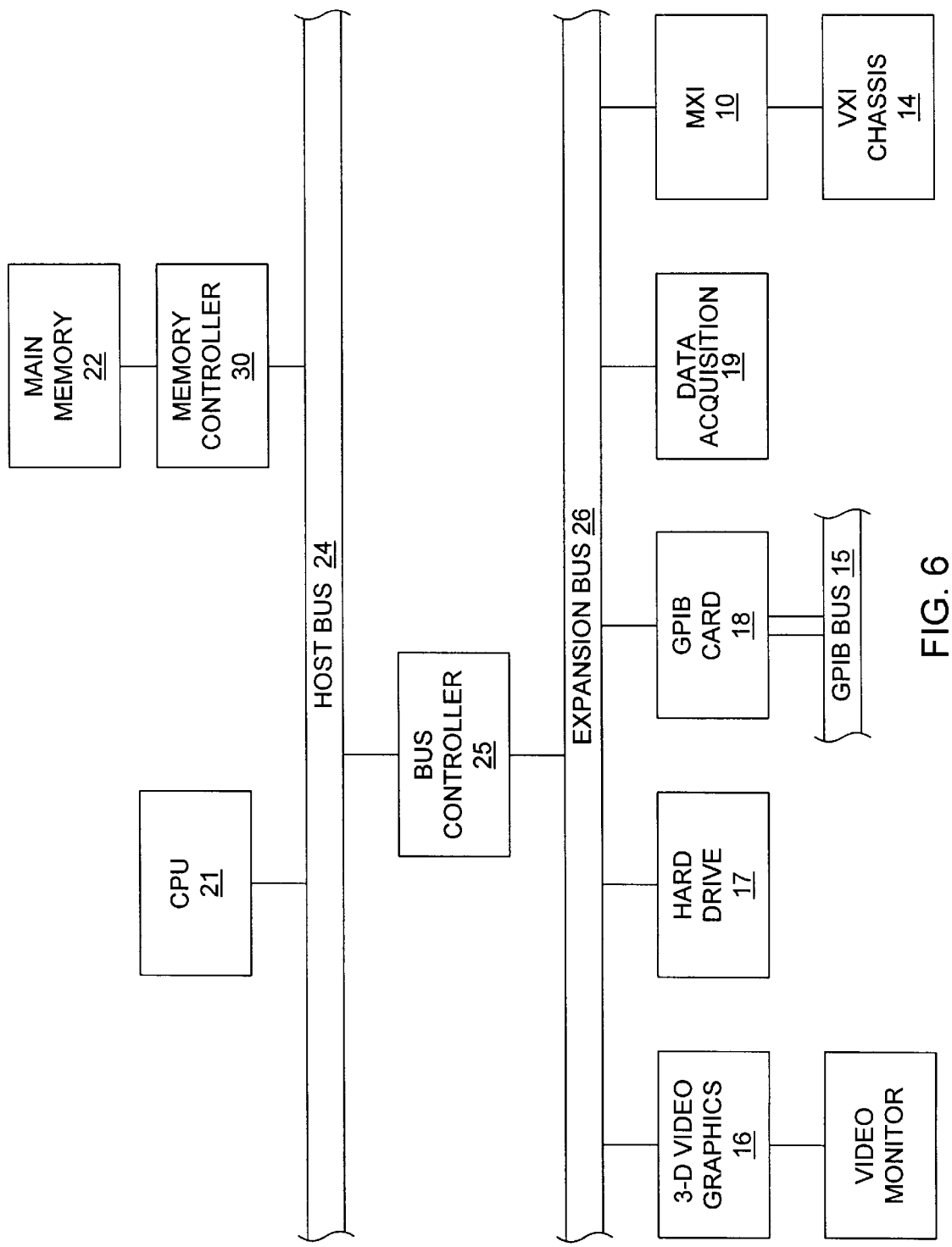
FIG. 6 is a block diagram of the computer system of FIGS. 4 and 5.

Referring now to FIG. 6, a block diagram of the computer system 206 is shown. The elements of a computer system not necessary to understand the operation of the present invention have been omitted for simplicity. The computer system 206 includes a central processing unit or CPU 21 which is coupled to a processor or host bus 24. The CPU 21 acts as the control processor 38. The CPU may be any of various types, including an Intel x86 processor such as the i486, a CPU from the Motorola family of processors, as well as others. Main memory 22 is coupled to the host bus 24 by means of memory controller 23. The main memory 22 stores the front panel editor 36, icon editor 34, block diagram editor 30 and execution subsystem 32. Host bus 24 is coupled to an expansion or input/output bus 26 by means of a bus controller 25.

The expansion bus 26 is preferably the PCI (Peripheral Component Interconnect) bus. Alternatively, the expansion bus 26 may be the AT or ISA (industry standard architecture) bus, the EISA (extended industry standard architecture) bus, or the MCA (Microchannel bus). The expansion bus 26 includes slots for various devices, including video 16 and hard drive 17. The video block 16 is preferably a 3-D video/graphics card which performs 3-D video functions, as is known in the art.

The computer system 206 also includes a GPIB (General Purpose Interface Bus) card 18 that interfaces to one or more instruments via the GPIB bus 15. The computer system 206 also includes an MXI card 10 that connects to VXI chassis 14. In one embodiment where the system and method of the present invention are used in an instrumentation application, a data acquisition card 19 is connected to the expansion bus 26. The data acquisition card 19 receives analog signals from an external transducer or sensor and in turn produces digital data that is provided to the CPU 21 and used by the system and method of the present invention.

Three-Dimensional Graphical Programming

Figure 7:
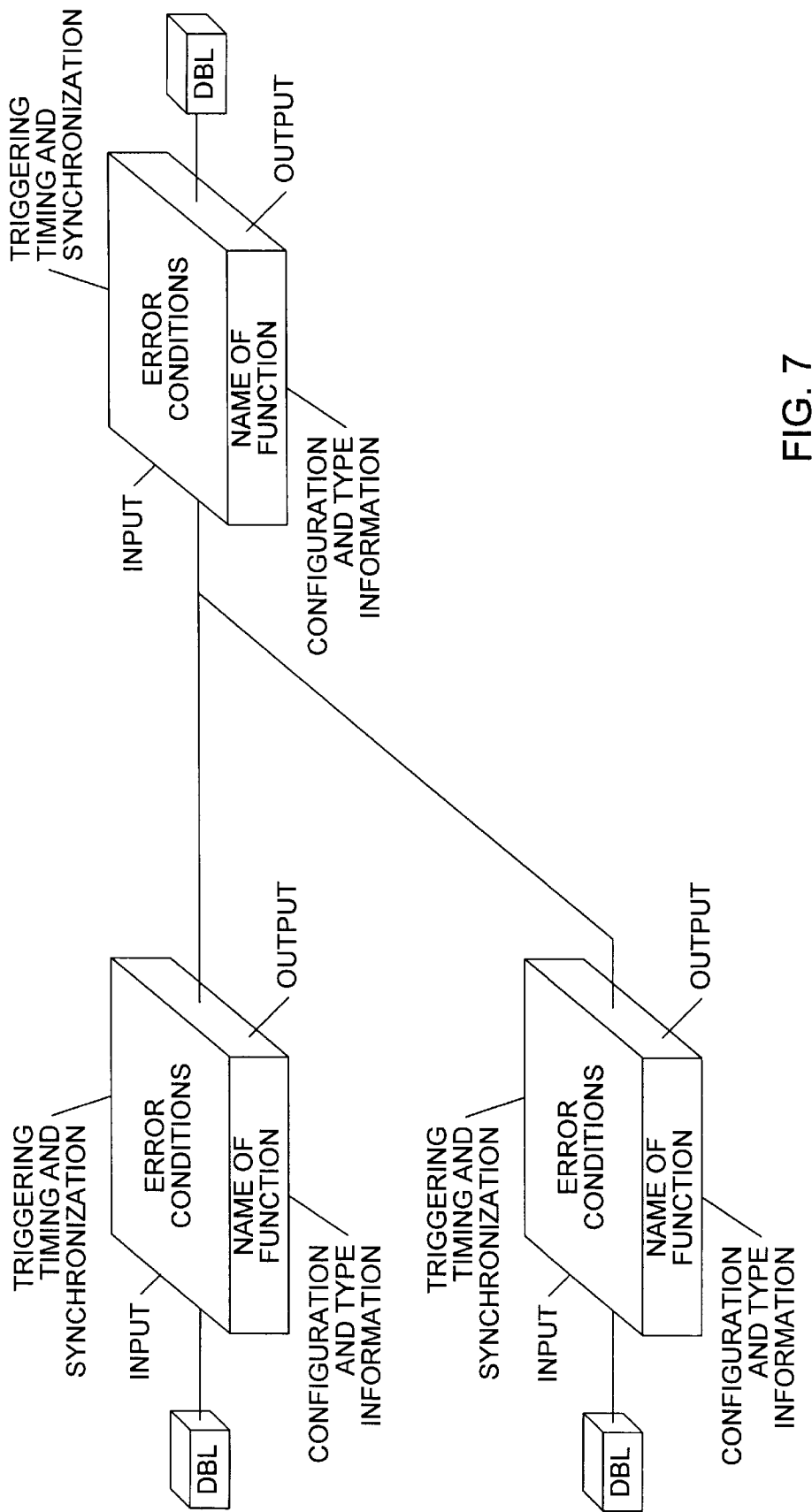
FIG. 7 illustrates an exemplary graphical program including three-dimensional nodes according to the present invention.

Referring now to FIG. 7, a computer generated display of a completed graphical program is shown. In the preferred embodiment, the graphical program is a data flow program or block diagram. Alternatively, the graphical program is an object-oriented program that is not a data flow program, as desired. As shown, the graphical program includes a plurality of three-dimensional node icons which perform desired functions. The three-dimensional node icons perform functions similar to the nodes described in the above U.S. patents and patent applications incorporated by reference, as well as in the LabVIEW virtual instrumentation system, version 3.1. The plurality of three-dimensional node icons may perform any of various functions, as desired.

Each of the plurality of three-dimensional node icons comprises a three-dimensional object or polygon having a plurality of sides. In the preferred embodiment, each of the three-dimensional node icons comprises a three-dimensional rectangular box. In an alternate embodiment, the three-dimensional node icons comprise different three-dimensional shapes based on the function performed by the node.

Each of the three-dimensional node icons has a plurality of sides, preferably six sides, including a left side, a right side, a top side, a bottom side, a front side, and a back side. The left side is preferably designated for receiving input data values, and the right side is preferably designated for producing output data values. The front side of each of the three-dimensional node icons is preferably used to display a name for the respective node icon or indicate the function of the node icon. One or more of the top side, bottom side and back side are preferably designated for receiving input data of various types.

In the preferred embodiment, the top side is preferably designated for receiving input data of a first type, the bottom side is preferably designated for receiving input data of a second type, and the back side is preferably designated for receiving input data of a third type. For certain nodes, one or more of these sides may be designated for various additional outputs, as desired. It is noted that various of the sides may be used for different input or output purposes, as desired.

In the preferred embodiment, the back side is designated for receiving triggering, timing and synchronization input data, the top side is designated for receiving error condition input data and/or initialization data, and the bottom side is designated for receiving base configuration signals and/or type declaration signals. Each of the respective sides of the node icons may be designed for various other types of status or input signals, or output signals, as desired. In the preferred embodiment, the input configuration of each of the three-dimensional nodes is designed to approximate real world instruments.

A user or developer assembles a graphical program on the video screen comprising a plurality of three-dimensional node icons. Assembling the graphical program includes interconnecting ones of said plurality of three-dimensional node icons to perform a desired fiction. Interconnecting the nodes comprises connecting the left sides of one or more of the plurality of three-dimensional node icons to receive input data values. In the preferred embodiment, the left side of each of the plurality of three-dimensional node icons typically receives output data values from the right side of a different one of the three-dimensional node icons. Alternatively, the left side of each of the three-dimensional node icons can receive data from any of various outputs of one or more other node icons or terminal icons.

Interconnecting the nodes further comprises connecting the back side of zero or more of the plurality of three-dimensional node icons to receive triggering, timing and synchronization input data, connecting the top side of zero or more of the plurality of three-dimensional node icons to receive error condition and/or initialization input data, and connecting the bottom side of zero or more nodes to receive base configuration and/or type declaration input signals. It is noted that one or more sides of each of the nodes, may be left unconnected, as desired.

If the user or developer connects a wire to a side of a three-dimensional node icon to receive input data other than the specified input, then the graphical programming system automatically breaks that connection, i.e., displays a broken wire. The graphical programming system includes a means for "breaking wires" on the video screen that comprises software executing on the CPU in conjunction with the display hardware, as is well known in the art. Breaking the wire or connection indicates that the wrong type of data has been connected to the input, thus providing increased error checking to the user.

The user or developer may also rotate the graphical program to view the program from a different side. In the present invention, the user can manipulate or rotate the graphical program or block diagram to view different sides and thus view different classes of inputs. In the preferred embodiment, the graphical programming system includes a means for rotating the graphical program which includes the 3-D graphics controller 16 and software executing on the CPU which performs 3-D manipulations, as is well known in the art.

Thus the user can rotate the graphical program 180 degrees to view all of the timing and synchronization input signals connected to the back side of each of the nodes. Likewise the user can rotate the graphical program 90 degrees to the left to view the graphical program from the right or output side, or can rotate the graphical program 90 degrees to the right to view the graphical program from the left or input side. The user can also rotate the graphical program to view the graphical program from the top side or the bottom side, as desired.

Method

Figure 8:
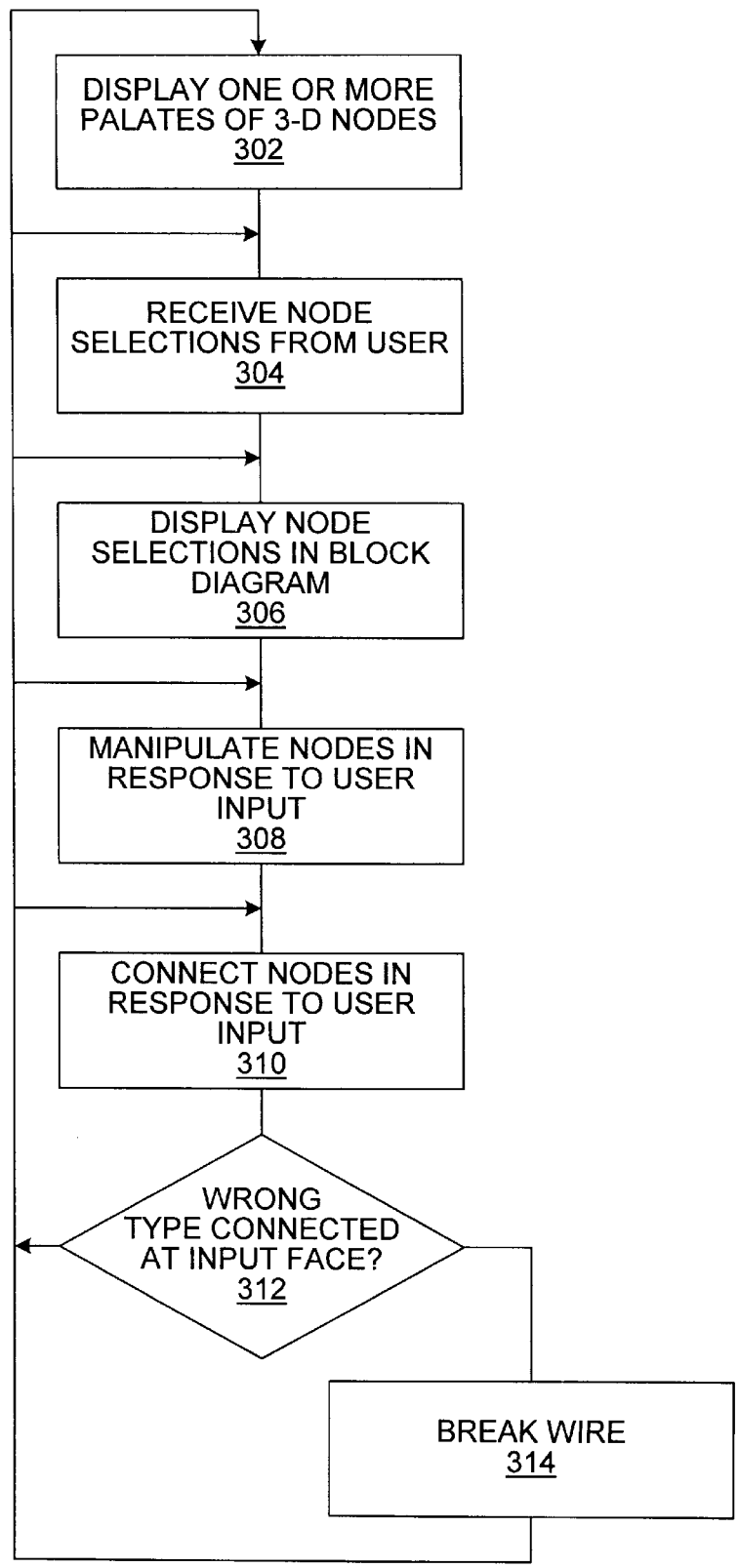
FIG. 8 is a flowchart diagram illustrating creation of a graphical program with 3-D graphical nodes according to the present invention.

Referring now to FIG. 8, a method for assembling a graphical program according to the present invention operates as follows. First, in step 302 the system displays on the video screen a plurality of three-dimensional node icons. The system preferably displays one or more libraries or palettes of three-dimensional node icons. As noted above, each of the three-dimensional node icons has a plurality of sides, preferably including a first side designated for receiving input data values, a second side designated for producing output data values, and one or more other sides for receiving input data of various types, or for producing output data of various types.

The user then selects the appropriate node icons to display in the block diagram where the program is created. The system receives this input in step 304 and displays the selected nodes in the block diagram or window in step 306.

The user then assembles the graphical program on the video screen comprising selected ones of the three-dimensional node icons. Assembling the graphical program includes the system manipulating or moving one or more of the three-dimensional node icons in step 308 and then interconnecting ones of said plurality of three-dimensional node icons in step 310 to perform a desired function. The system performs steps 306 and 308 in response to user input. The assembling step includes connecting the respective sides of the node icons to receive data of pre-defined or specified types.

As discussed above, in the embodiment shown in FIG. 7, interconnecting the nodes typically comprises connecting the left sides of one or more of the plurality of three-dimensional node icons to receive input data values. Interconnecting the nodes preferably further comprises connecting the back side of one or more of the plurality of three-dimensional node icons to receive triggering, timing and synchronization input data, connecting the top side of one or more of the plurality of three-dimensional node icons to receive error condition and/or initialization input data, and connecting the bottom side of one or more nodes to receive base configuration and/or type declaration input signals.

It is noted that, in some graphical programs, one or more sides of each of the nodes may not be connected to receive input or output data. Thus, in some graphical programs, the back sides of all of the nodes may be unconnected, or the top sides of all of the nodes may be unconnected, as desired.

When the user connects the a data input to a side of a node in step 310, in step 312 the system determines if the wrong type of data has been connected to the respective side or face of the node. If the wrong type of data is determined to have been connected to the respective side or face of the node, then in step 314 the system "breaks the wire" or otherwise indicates to the user that a bas connection has been made. In one embodiment, the system flashes or blinks the side or face of the node on the computer screen where the wrong input is connected. After step 314, or if the connection is correct, the system then returns to execute either of steps 302, 304, 306, 308, or 310, depending on user input.

At any point in time, the user can rotate the graphical program to view the program from any side, as desired. Thus, as noted above, the user can rotate the graphical program to view the program from various sides, as desired. In one embodiment of the invention, the user can "open up" VIs from the front side to view signal processing relationships, and also "open up" the VI from the rear side to view detailed timing relationships.

FIGS. 9–11

Figure 9:
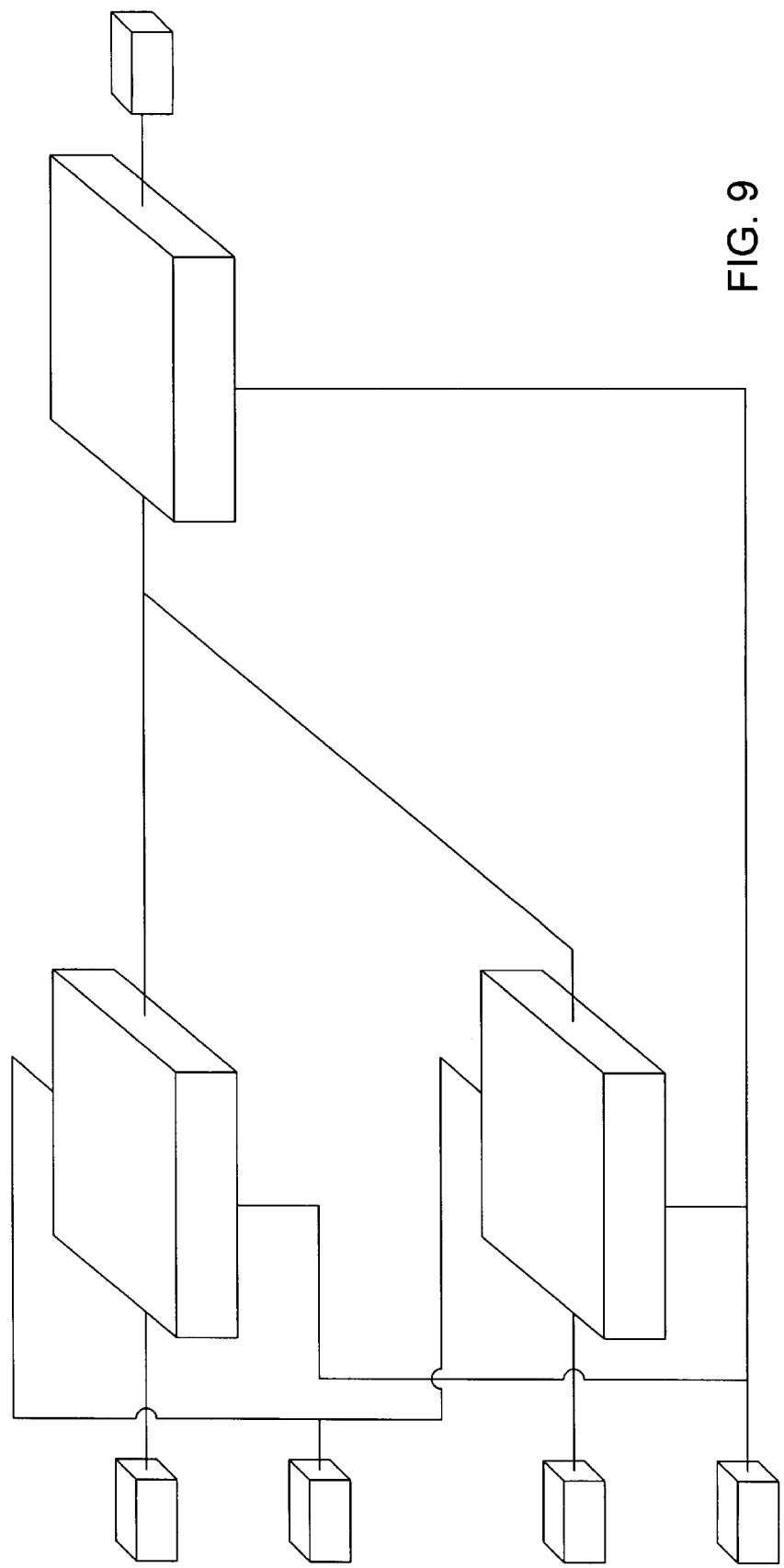
Figure 10:
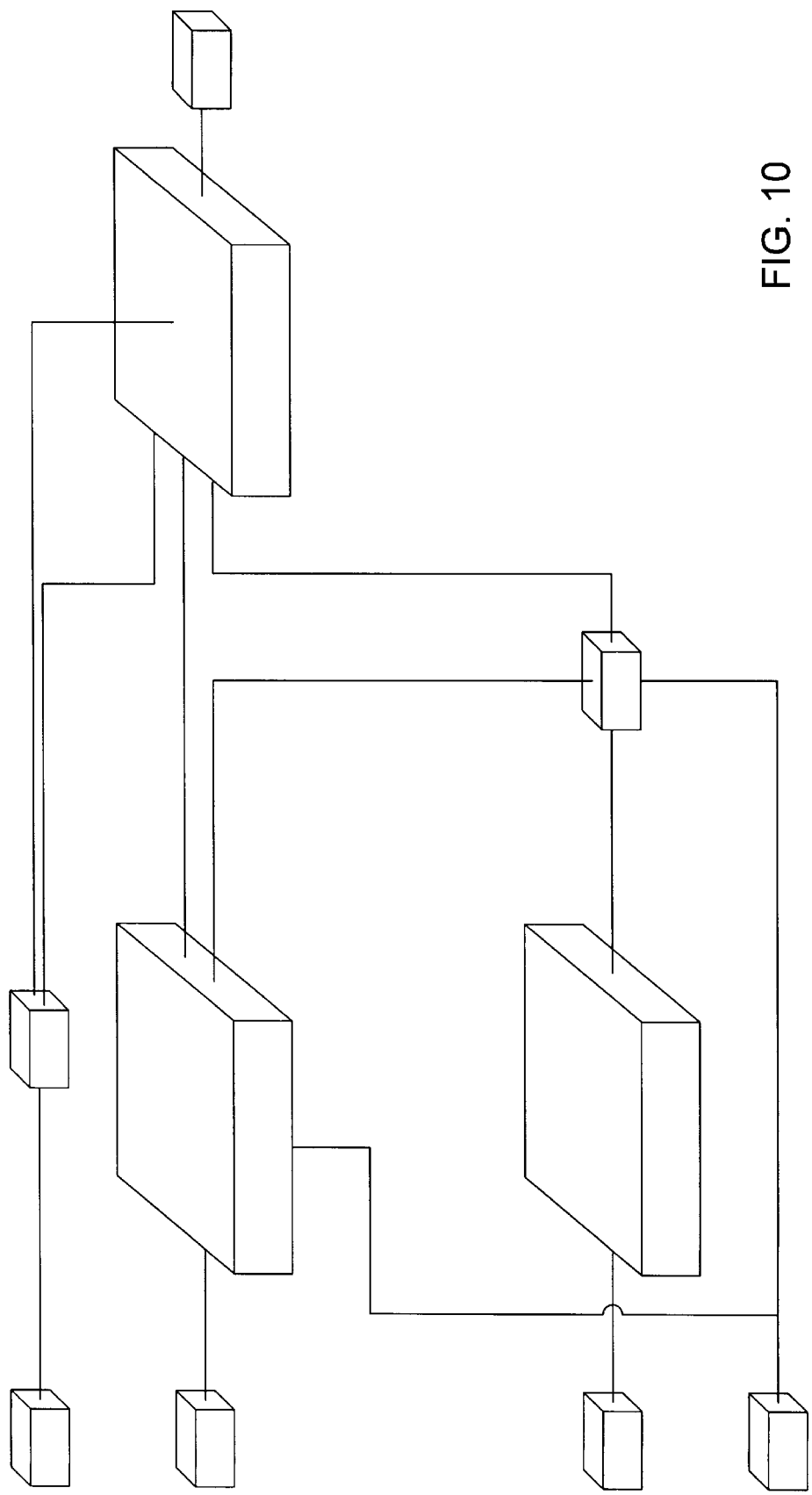

FIGS. 9–11 illustrate other examples of graphical programs which include three-dimensional nodes according to the present invention. As shown, FIG. 9 illustrates a simple graphical program where each of the nodes receives configuration and/or type declaration information at its bottom face input, and two of the nodes receive triggering inputs at their back face. FIGS. 10 and 11 illustrate simple graphical programs where certain of the nodes receive input data at their top and/or bottom faces.

Computer-Readable Memory

The present invention preferably comprises a computer program which is stored on or in a computer-readable memory, such as random access memory, one or more floppy disks, a CD-ROM, or other types of memory. The computer program is executable by a computer system to perform the 3-D graphical programming steps described above. The computer program stored in a memory of a computer system also forms a 3-D graphical programming system according to the present invention, as described above.

Conclusion

Therefore, the present invention comprises a system and method for constructing three-dimensional graphical programs wherein each of the nodes have faces or sides designed to receive pre-defined inputs or designed to produce pre-defined outputs. The present invention thus facilitates node connectivity and provides increased error checking.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for assembling a graphical program in a computer system including a video screen and means for creating a graphical program, wherein the graphical program comprises a plurality of interconnected node icons, the method comprising:

displaying on the screen a plurality of three-dimensional node icons, wherein each of the three-dimensional node icons has a plurality of sides, including a first side designated for receiving input data values, a second side designated for producing output data values, and a third side designated for receiving input data of a first type; and assembling on the screen a graphical program comprising the plurality of three-dimensional node icons, wherein said assembling includes interconnecting ones of said plurality of three-dimensional node icons to perform a desired function, wherein said assembling comprises:

connecting the first side of one or more of said plurality of three-dimensional node icons to receive input data values;

connecting the second side of one or more of said plurality of three-dimensional node icons to an input of a different one of said plurality of three-dimensional node icons; and connecting the third side of one or more of said plurality of three-dimensional node icons to receive input data of said first type.

2. The method of claim 1, wherein said third side is designated for receiving triggering, timing and/or synchronization input data.

3. The method of claim 1, wherein said third side is designated for receiving error condition input data.

4. The method of claim 1, wherein said third side is designated for receiving configuration data.

5. The method of claim 1, further comprising:

connecting a wire to the third side of one or more of said plurality of three-dimensional node icons to receive input data other than said first type, wherein said input data other than said first type comprises invalid input due to a user error; and breaking said wire to the third side of one or more of said plurality of three-dimensional node icons which receives input data other than said first type.

6. The method of claim 1, further comprising:

rotating said graphical program on the video screen during said assembling to view said graphical program from a different side.

7. The method of claim 1, wherein said plurality of three-dimensional node icons each further include a fourth side designated for receiving input data of a second type, and a fifth side for receiving input data of a third type, the method further comprising:

connecting the fourth side of one or more of said plurality of three-dimensional node icons to receive input data of said second type; and connecting the fifth side of one or more of said plurality of three-dimensional node icons to receive input data of said third type.

8. The method of claim 7, wherein said third side is designated for receiving triggering, timing or synchronization input data, wherein said fourth side is designated for receiving error condition input data, and wherein said fifth side is for receiving configuration signals.

9. The method of claim 1, wherein each of said plurality of three-dimensional node icons comprises a three-dimensional polygon having a plurality of sides.

10. The method of claim 9, wherein each of said plurality of three-dimensional node icons comprises a three-dimensional rectangular box having a plurality of sides.

11. The method of claim 10, wherein each of said plurality of three-dimensional node icons comprises six sides, including a left side, a right side, a top side, a bottom side, a front side, and a back side;

wherein said left side is said first side designated for receiving input data values;

wherein said right side is said second side designated for producing output data values;

wherein one or more of said top side, said bottom side, said front side and said back side is designated for receiving input data of respective types.

12. The method of claim 11, wherein said top side is designated for receiving input data values of a first type;

wherein said bottom side is designated for receiving input data values of a second type; and wherein said back side is designated for receiving input data values of a third type.

13. The method of claim 12, wherein said front side of each of said plurality of three-dimensional node icons displays a name for the respective node icon.

14. The method of claim 1, wherein the first side of the one or more of said plurality of three-dimensional node icons receives output data values from the second side of one or more of said plurality of three-dimensional node icons.

15. A computer system which performs graphical programming operations, comprising:

a video monitor including a video screen;

a plurality of three-dimensional node icons comprised on the video screen, wherein each of the three-dimensional node icons has a plurality of sides, including a first side designated for receiving input data values, a second side designated for producing output data values, and a third side designated for receiving input data of a first type;

means for assembling on the screen a graphical program comprising the plurality of three-dimensional node icons, wherein said means for assembling interconnects ones of said plurality of three-dimensional node icons to perform a desired function;

wherein said means for assembling connects the first side of one or more of said plurality of three-dimensional node icons to receive input data values;

wherein said means for assembling connects the second side of one or more of said plurality of three-dimensional node icons to provide output data values to a different one of said plurality of three-dimensional node icons; and wherein said means for assembling connects the third side of one or more of said plurality of three-dimensional node icons to receive input data of said first type.

16. The computer system of claim 15, wherein said plurality of three-dimensional node icons each further include a fourth side designated for receiving input data of a second type, and a fifth side for receiving input data of a third type;

wherein said means for assembling connects the fourth side of one or more of said plurality of three-dimensional node icons to receive input data of said second type; and wherein said means for assembling connects the fifth side of one or more of said plurality of three-dimensional node icons to receive input data of said third type.

17. The computer system of claim 16, wherein said third side of each of said plurality of three-dimensional node icons is designated for receiving triggering, timing or synchronization input data; and wherein said fourth side of each of said plurality of three-dimensional node icons is designated for receiving error condition input data;

wherein said fifth side of each of said plurality of three-dimensional node icons is designated for receiving configuration data.

18. The computer system of claim 15, wherein each of said plurality of three-dimensional node icons comprises a three-dimensional polygon having a plurality of sides.

19. The computer system of claim 18, wherein each of said plurality of three-dimensional node icons comprises a three-dimensional rectangular box having a plurality of sides.

20. The computer system of claim 19, wherein each of said plurality of three-dimensional node icons comprises six sides, including a left side, a right side, a top side, a bottom side, a front side, and a back side;

wherein said left side is said first side designated for receiving input data values;

wherein said right side is said second side designated for producing output data values; and wherein one or more of said top side, said bottom side, said front side and said back side is designated for receiving input data of respective types.

21. The computer system of claim 20, wherein said top side is designated for receiving input data values of a first type;

wherein said bottom side is designated for receiving input data values of a second type; and wherein said back side is designated for receiving input data values of a third type.

22. The computer system of claim 20, wherein said front side of each of said plurality of three-dimensional node icons displays a name for the respective node icon.

23. The computer system of claim 15, wherein said third side is designated for receiving triggering, timing and synchronization input data.

24. The computer system of claim 15, wherein said third side is designated for receiving error condition input data.

25. The computer system of claim 15, wherein said third side is designated for receiving configuration data.

26. The computer system of claim 15, further comprising:

means for breaking wires to a side of one or more of said plurality of three-dimensional node icons which receives input data other than said designated type, wherein said input data other than said designated type comprises invalid input due to a user error.

27. The computer system of claim 15, further comprising:

means for rotating said graphical program on tile video screen during said assembling to view said graphical program from a different side.

28. A computer readable memory which directs a computer to perform graphical programming functions, comprising:

a computer program comprised in the memory for rendering a plurality of three-dimensional node icons on a video screen of the computer system to form a graphical program, wherein each of the three-dimensional node icons has a plurality of sides, including a first side designated for receiving input data values, a second side designated for producing output data values, and a third side designated for receiving input data of a first type;

wherein the computer program connects the first side of one or more of said plurality of three-dimensional node icons to receive input data values;

wherein the computer program connects the second side of one or more of said plurality of three-dimensional node icons to provide output data values to a different one of said plurality of three-dimensional node icons; and wherein the computer program connects the third side of one or more of said plurality of three-dimensional node icons to receive input data of said first type.

29. The method of claim 1, further comprising:

connecting a wire to the third side of one or more of said plurality of three-dimensional node icons to receive input data other than said first type;

indicating an invalid condition in response to said connecting a wire to the third side to receive input data other than said first type.

30. The computer system of claim 15, further comprising:

means for indicating an invalid condition when a side of one or more of said plurality of three-dimensional node icons receives input data other than said designated type.

31. The medium of claim 29, wherein the program instructions are further executable to implement:

connecting a wire to the third side of one or more of said plurality of three-dimensional node icons to receive input data other than said first type; and indicating an invalid condition in response to said connecting a wire to the third side to receive input data other than said first type.

32. A computer-readable storage medium comprising program instructions for assembling a graphical program in a computer system, the computer system including a video screen, wherein the graphical program comprises a plurality of interconnected node icons, wherein Me program instructions are executable to implement:

displaying on the screen a plurality of three-dimensional node icons, wherein each of the three-dimensional node icons has a plurality of sides, including a first side designated for receiving input data values, a second side designed for producing output data values, and a third side designated for receiving input data of a first type; and assembling on the screen a graphical program comprising the plurality of three-dimensional node icons, wherein said assembling includes interconnecting ones of said plurality of three-dimensional node icons to perform a desired function, wherein said assembling comprises:

connecting the first side of one or more of said plurality of three-dimensional node icons to receive it data values;

connecting the second side of one or more of said plurality of three-dimensional node icons to an input of a different one of said plurality of three-dimensional node icons; and connecting the third side of one or more of said plurality of three-dimensional node icons to receive input data of said first type.

33. The medium of claim 29, wherein the program instructions are further executable to implement:

connecting a wire to the third side of one or more of said plurality of three-dimensional node icons to receive input data other than said first type, wherein said input data other than said first type comprises invalid input due to a user error; and breaking said wire to the third side of one or more of said plurality of three-dimensional node icons which receives input data other than said first type.

34. The medium of claim 29, wherein said third side is designated for receiving error condition input data.

35. The medium of claim 29, wherein said third side is designated for receiving configuration data.

36. The medium of claim 29, wherein the program instructions are further executable to implement:

connecting a wire to the third side of one or more of said plurality of three-dimensional node icons to receive input data other than said first type; and breaking said wire to the third side of one or more of said plurality of three-dimensional node icons which receives input data other than said first type.

37. The medium of claim 29, wherein the program instructions are further executable to implement:

rotating said graphical program on the video screen during said assembling to view said graphical program from a different side.

38. The medium of claim 29, wherein said plurality of three-dimensional node icons each further include a fourth side designated for receiving input data of a second type, and a fifth side for receiving input data of a third type, wherein the program instructions are further executable to implement:

connecting the fourth side of one or more of said plurality of three-dimensional node icons to receive input dam of said second type; and connecting the fifth side of one or more of said plurality of three-dimensional node icons to receive input data of said third type.

39. The medium of claim 35, wherein said third side is designated for receiving triggering, timing or synchronization input data, wherein said fourth side is designated for receiving error condition input data, and wherein said fifth side is for receiving configuration signals.

40. The medium of claim 29, wherein each of said plurality of three-dimensional node icons comprises a three dimensional polygon having a plurality of sides.

41. The medium of claim 37, wherein each of said plurality of three-dimensional node icons comprises a three-dimensional angular box having a plurality of sides.

42. The medium of claim 38, wherein each of said plurality of three-dimensional node icons comprises six sides, including a left side, a right side, a top side, a bottom side, a font side, and a bottom side;

wherein said left side is said first side designated for receiving input data values;

wherein said right side is said second side designated for producing output data values;

wherein one or more of said top side, said bottom side, said front side and said back side is designated for receiving input data of respective types.

43. The method of claim 1, further comprising:

connecting a wire to the third side of one or more of said plurality of three-dimensional node icons to receive input data other than said first type, wherein said input data other than said first type comprises invalid input due to a user error;

indicating an invalid condition in response to said connecting a wire to the third side to receive input data other than said first type.

44. The computer system of claim 15, further comprising:

means for indicating an invalid condition when a side of one or more of said plurality of three-dimensional node icons receives input data other than said designated type, wherein said input data other than said designated type comprises invalid input due to a user error.

45. The medium of claim 29, wherein the program instructions are further executable to implement:

connecting a wire to the third side of one or more of said plurality of three-dimensional node icons to receive input data other than said first type, wherein said input data other than said first type comprises invalid input due to a user error; and indicating an invalid condition in response to said connecting a wire to the third side to receive input data other than said first type.

* * * * *

UNITED STATES PATENT AND TRADEMARK OFFICE
CERTIFICATE OF CORRECTION

PATENT NO. : 5,987,246
DATED : November 16, 1999
INVENTOR(S) : Thomsen, et. al.

It is certified that error appears in the above-identified patent and that said Letters Patent is hereby corrected as shown below:

Claim 27, col. 12, line 24, please delete "claim 15" and substitute --claim 1--.
Claim 27, col. 12, line 25, please delete "tile" and substitute --the--.

Please delete claims 29, 30 and 31 and replace with:

29. The method of claim 1, further comprising:

connecting a wire to the third side of one or more of said plurality of three-dimensional node icons to receive input data other than said first type, wherein said input data other than said first type comprises invalid input due to a user error;

indicating an invalid condition in response to said connecting a wire to the third side to receive input data other than said first type.

30. The computer system of claim 15, further comprising:

means for indicating an invalid condition when a side of one or more of said plurality of three-dimensional node icons receives input data other than said designated type, wherein said input data other than said designated type comprises invalid input due to a user error.

31. The medium of claim 29, wherein the program instructions are further executable to implement:

connecting a wire to the third side of one or more of said plurality of three-dimensional node icons to receive input data other than said first type, wherein said input data other than said first type comprises invalid input due to a user error; and indicating an invalid condition in response to said connecting a wire to the third side to receive input data other than said first type.

UNITED STATES PATENT AND TRADEMARK OFFICE
CERTIFICATE OF CORRECTION

PATENT NO. : 5,987,246
DATED : November 16, 1999
INVENTOR(S) : Thomsen, et. al.

It is certified that error appears in the above-identified patent and that said Letters Patent is hereby corrected as shown below:

Claim 32, col. 13, line 8, please delete "Me" and substitute --the--.
Claim 32, col. 13, line 23, please delete "it" and substitute --input--.

Please delete claim 36 and replace with:

36. The medium of claim 29, wherein said third side is designated for receiving triggering, timing and/or synchronization input data.

Claim 38, col. 14, line 6, please delete "dam" and substitute --data--.

Claim 42, col. 14, line 25, please delete "font" and substitute --front--.
Claim 42, col. 14, line 25, please delete "bottom" and substitute --back--.

Please delete claims 43, 44 and 45 and replace with:

43. The medium of claim 39, wherein said top side is designated for receiving input data values of a first type;

wherein said bottom side is designated for receiving input data values of a second type; and wherein said back side is designated for receiving input data values of a third type.

UNITED STATES PATENT AND TRADEMARK OFFICE
CERTIFICATE OF CORRECTION

Page 3 of 3

PATENT NO. : 5,987,246
DATED : November 16, 1999
INVENTOR(S) : Thomsen, et. al.

It is certified that error appears in the above-identified patent and that said Letters Patent is hereby corrected as shown below:

44. The medium of claim 40, wherein said front side of each of said plurality of three-dimensional node icons displays a name for the respective node icon.

45. The medium of claim 29, wherein the first side of the one or more of said plurality of three-dimensional node icons receives output data values from the second side of one or more of said plurality of three-dimensional node icons.

Signed and Sealed this

Twelfth Day of September, 2000

Q. TODD DICKINSON

*Attest:*

*Attesting Officer*           *Director of Patents and Trademarks*